Patented Feb. 21, 1939

2,148,062

UNITED STATES PATENT OFFICE 2,148,062

METHOD OF FORMING POLYVINYL ACETAL RESIN SHEETS

Gustavus J. Esselen, Swampscott, and Elmer R. Derby, Springfield, Mass., assignors to Monsanto Chemical Company, St. Louis, Mo., a corporation of Delaware No Drawing. Application November 28, 1938, Serial No. 242,814

5 Claims. (Cl. 18—57)

The present application is a continuation in part of our prior application Serial No. 79,717, filed May 14, 1936.

Our present invention relates to the formation of polyvinyl acetal resin into a continuous sheet or web from which pieces may be cut for use in the arts and particularly in the manufacture of laminated glass, such as is employed in motor vehicles. By polyvinyl acetal resin, we refer to the materials described in the patent to Morrison, Skirrow and Blaikie, No. 2,036,092, dated March 31, 1936, and in the French patent to Carbide & Carbon Chemical Corporation No. 793,175. To give to this material the qualities which are desirable if it is to be used as an inner layer for laminated glass certain compatible plasticizers, for instance, dibutyl, diethyl and dimethyl phthalate, carbitol acetate, di-ethyleneglycol-dipropionate must be mixed with it. Heretofore, in the manufacture of sheet material of this kind whether by the cake process or the continuous process it has been thought necessary to make a mix containing a substantial amount of volatile solvent as well as the other ingredients. The volatile solvent was thought to be necessary to convert the mix into a suitable state for handling, but was the source of serious losses since all the solvent was removed during seasoning, the expense of solvent recovery being greater than the value of any solvent which might be recovered. Not only was the solvent lost and wasted, but the labor necessary to incorporate it in the mix, and afterwards of seasoning the stock to remove the solvent, were wholly wasted. The fire hazard was serious owing to the inflammable character of the solvent and in certain cases of the stock itself. Difficulty was also experienced as there was a tendency of the volatile solvent to form bubbles during processing. Polyvinyl acetal resin is so tenacious of certain volatile liquids which may be mixed with it to render it soft enough for extrusion in the form of a web that the necessary removal of these liquids during curing is a long, expensive and difficult process. An extremely long ribbon must be retained in the drying apparatus so that there is a large amount of stock in process and the machine required is inconveniently long and expensive. Furthermore, although the material is thermo-plastic and may be softened by heat, it is so sticky and tacky, particularly when proportions of plasticizer are used which are sufficient to meet the present day requirements of the safety glass manufacturers, that the stock tends to adhere tenaciously to all surfaces with which it contacts, such as the die lips, rollers or rods over which it must be led during curing and an unsatisfactory ribbon or web is produced. The liquids in the mix greatly increase the tendency of the characteristically limp and rubbery ribbon or web to stretch and make it necessary to support it at frequent intervals and increase the difficulty of handling during seasoning. Webs produced from this material not only are rubbery and tough, but when stretched contract slowly for a long time. Altogether this has caused serious losses and expenses, as a result of putting into the mix something which has to be removed to make the final product.

Retention of liquids, even although very small quantities remain, also gives undesirable properties to the web, such as haze and lack of stability. It reduces the strength of laminated glass at temperatures such as are met with in the tropics and tends to the formation of bubbles at the high temperature of the enamel baking oven to which the laminated glass may be subjected later.

We have discovered that all these losses and difficulties may be done away with if the polyvinyl acetal resin is mixed with compatible plasticizers but without solvent liquids and is then formed into a web by extrusion through a suitable die. By employing suitable plasticizers in suitable quantities, the solvent liquids which would otherwise be required may be omitted altogether and the web produced by the extrusion die is not so sticky and tacky, particularly if chilled immediately upon emerging from the die, that it cannot be handled with a reasonable degree of convenience over rollers. No curing is required because the web contains no solvent. Consequently, the expense for driers or seasoning chambers, for factory space, and for stock in process is greatly reduced, and the other difficulties are avoided or are lessened.

In practicing our invention, a satisfactory mix consists of 100 lbs. of polyvinyl acetal resin with 60 lbs. of diethylene-glycol-dipropionate. The polyvinyl acetal resin employed is made by hydrolizing a polyvinyl acetate until it is about 90 to 91% hydrolized. The resulting compound is then combined with formaldehyde to such an extent that the final product contains about 8% of polyvinyl alcohol which has not reacted with the formaldehyde. In other words, the final product contains between 80 and 85% of the acetal compound the remainder being partly polyvinyl alcohol and partly polyvinyl acetate. It should be understood, however, that the resulting product is a highly polymerized substance in which the acetal compound, the polyvinyl alcohol and the polyvinyl acetate are all combined together in large molecules and therefore the exact determination of the proportions of each is a matter of difficulty. The above description of the material is given by way of illustration and it is not intended to limit the invention thereby except as may be expressly stated in the claims. It will be understood that other polyvinyl acetal resins of varying characteristics such as those described in the two patents mentioned above may also be employed. Another example of a suitable mixture is 100 lbs. of polyvinyl acetal resin of the kind already described together with 60 lbs. of diethylene-glycol-dipropionate and a certain amount of some suitable diluent, for instance, 5 lbs. camphor or 1 lb. of glycol laurate. This mixture produces a less tacky and sticky sheet. Webs or sheets produced from material of this character are rubbery and tough, and have the property of contracting slowly and for a long time if stretched.

The polyvinyl acetal resins and the plasticizers and diluent or diluents if used, are mixed in a suitable mixer, for instance, a Werner and Pfleiderer machine, at a temperature of about 220° F., the mixing being continued for two hours more or less until a homogeneous mass results. The mass then goes into the extruder, being forced between the die lips of a suitable die and coming out in the form of a sheet of a desired thickness, the thickness being determined primarily by the width of the space between the die lips, though, as is well understood by those skilled in the art, the thickness is affected by other factors such, for instance, as the pressure of extrusion, the viscosity of the mixture, the temperature of extrusion, and the rate at which it is taken away from the die lips. In practice it is desirable to chill the sheet to room temperature or lower immediately on emerging from the orifice of the die to set and harden it. This chilling may be done artificially as by blasts of air applied to opposite sides of the sheet. By "artificially" chilling is meant any procedure other than mere exposure to normal room atmosphere and adapted to lower the temperature of the sheet more quickly than would be effective by exposure to normal temperature. If this procedure is employed, it is useful to use blasts of air on opposite sides of the sheet, the blasts being strong enough to cause the sheet to flutter violently at the die. This fluttering appears to have an important beneficial effect on the operation of the machine and we believe that it tends to release the adhesion of the stock to the die lips.

By employing the hereindescribed method, we are able to form rapidly sheets of stock from polyvinyl acetal resin even though plasticizers are used of such a nature and in such quantities as to render the stock strongly adherent to highly polished surfaces such as metal and glass when heated to the temperatures and under the pressures now ordinarily employed in making laminated glass. We find that by using this process we are able to form continuous sheets or webs of this tacky material at commercially practical speeds.

Since no volatile solvent is employed, the consistency or viscosity of the mix is more constant and is subject to better control. Therefore, difficulties in a continuous process of manufacture resulting from changes in consistency are much less troublesome than with a mix which includes volatile solvent some of which is lost with consequent variation in consistency during the process of manufacture.

Another example which produces satisfactory results is as follows:

A polyvinyl acetal resin is made by combining a partially hydrolyzed polyvinyl acetate with butyraldehyde under such conditions as to give a product containing approximately 18-20% uncombined polyvinyl alcohol, 1-2% polyvinyl acetate and the balance substantially acetal. This is mixed with 43 parts of triethylene glycol dihexoate to each 100 parts of the vinyl acetal resin. No volatile solvent is used.

The resin and plasticizer are mixed together in any convenient type of mixer as, for example, a jacketed kneading machine and the mass is agitated until it takes on a sponge-like consistency. If this mixing operation is carried on at a temperature of approximately 120° F. the operation takes about one hour for a batch of 200 or 300 lbs. of resin. The resin is put in the machine first and the plasticizer is then poured in, being distributed as well as possible. Where two or more plasticizers are used they are mixed in the required proportions before being added to the resin.

After the mixture has assumed the uniform sponge-like consistency it is transferred to a Banbury mixer which is at a temperature of approximately 180° F. Within two or three minutes the batch begins to decrease in volume, loses its spongy quality and begins to weld into a tough, translucent mass. Cold water is then circulated through the jacket of the Banbury mixer and mixing is continued for from twelve to fifteen minutes longer after which the entire mass will have become tough and rubbery. Even though cold water has been circulated through the jacket of the mixer the internal heat raises the temperature of the mix to approximately 280° F. at this point. The material is now ready to be filtered or strained.

The tough, rubbery mixture, prepared as described above, is fed in chunks of about 15 lbs. each into the cylinder of a hydraulic strainer. With each addition the mass is packed tightly by a packing ram. The mass as it comes from the mixer is usually opaque due to the presence of air bubbles but during the packing of the straining cylinder the greater part of the entrapped air is forced out and the opacity decreases.

The mix is forced through a fine chrome steel screen backed by a Monel metal screen. Particles of dirt and foreign matter are removed by these filter media. The strainer plate which supports the filter media is heated to between 240° to 310° F., the lower temperature range being preferred. The cylinders of the hydraulic strainers are heated to between 160 and 220° F. about 180° F. being preferred.

From the outlet of the hydraulic strainer the filtered stock is fed under pressure to an extrusion machine in which the extrusion slot is formed between a die blade and a die roll, this machine being of the type shown in the application of Parkhurst and Derby, Serial No. 142,352, filed May 13, 1937, in which the temperature of the body of the machine is maintained between 280° and 320° F., preferably about 300° F., and the die blade is maintained between 230° F. and 280° F., about 240 F. being preferred; the die roll is maintained at 120° F. to 150° F., about 130° F. being preferred; the take-off roll is maintained between 160° F. and 200° F., about 180° F. being preferred. The temperature of the stock at the moment of sheet formation, i. e., when it passes under the die blade, is difficult to ascertain and is not uniform throughout the thickness of the sheet since the surface in contact with the die roll is chilled, while the surface in contact with the die blade is still relatively hot. Before contacting with the die roll, its temperature is between 160° F. and 220° F., preferably about 200° F. For some formulations where the quantity of plasticizer is increased and the plastic is consequently more heat sensitive, a downward revision of 10° to 20° F., in temperature is allowed. Although the die roll is maintained at a temperature above that of the atmosphere, it has the effect of chilling the stock since its temperature is much below that of the stock itself. The pressure in the chamber behind the die orifice is maintained at 350 to 400 lbs. per square inch. These operating conditions apply to a particular extrusion unit operating on the mix described at a ribbon speed of 10 to 35 feet per minute and producing stock of 0.015 inch thickness.

It should be recognized that there is an interdependence between temperatures, pressures and speeds and that they are a function of the size of the units as well as of the properties of the plastic.

We claim:

1. The method of making a continuous web of polyvinyl acetal resin which includes mixing and kneading substantially volatile solvent free resin and a sufficient amount of substantially volatile solvent free plasticizer to produce a material which when sheeted is adherent to highly polished surfaces under heat and pressure, until a homogeneous mixture is obtained, softening the mixture by heat in the absence of a volatile solvent and forcing the softened mixture through the slot of a die to form it into a continuous web.

2. The method of making a continuous web of polyvinyl acetal resin which includes mixing and kneading substantially volatile solvent free resin and a sufficient amount of substantially volatile solvent free plasticizer to produce a material which when sheeted is adherent to highly polished surfaces under heat and pressure, until a homogeneous mixture is obtained, softening the mixture by heat in the absence of a volatile solvent and forcing the softened mixture through the slot of a die to form it into a continuous self-sustaining web and then artificially chilling the web.

3. The method of making a continuous web of polyvinyl acetal resin which includes mixing and kneading substantially 100 lbs. of substantially volatile solvent free polyvinyl acetal resin and about 60 lbs. by weight of substantially volatile solvent free compatible plasticizer to produce a material which when sheeted is adherent to highly polished surfaces under heat and pressure until a homogeneous mixture is obtained, softening the mixture by heat in the absence of a volatile solvent and forcing the softened mixture through a slot of a die to form it into a continuous self-sustaining web and artificially chilling the formed web.

4. The method of making a continuous web of polyvinyl acetal resin which includes mixing and kneading substantially volatile solvent free resin and a sufficient amount of substantially volatile solvent free plasticizer to produce a material which when sheeted is adherent to highly polished surfaces under heat and pressure, until a homogeneous mixture is obtained, softening the mixture by heat at a temperature of about 200° F. in the absence of a volatile solvent and forcing the softened mixture through the slot of a die to form it into a continuous web and then artificially chilling the formed web.

5. The method of making a continuous web of polyvinyl acetal resin which includes mixing and kneading substantially volatile solvent free resin and of sufficient amount of substantially volatile solvent free plasticizer to produce a material which when sheeted is adherent to highly polished surfaces under heat and pressure, until a homogeneous mixture is obtained, softening the mixture by heat in the absence of a volatile solvent and forcing the softened mixture through the slot of a die to form it into a continuous self-sustaining web and chilling it artificially as it emerges from the die orifice.

GUSTAVUS J. ESSELEN.
ELMER R. DERBY.